(12) United States Patent
Holness et al.

(10) Patent No.: US 10,193,765 B2
(45) Date of Patent: Jan. 29, 2019

(54) PROTECTION SWITCHING SYSTEMS AND METHODS IN A PACKET NETWORK BASED ON SIGNAL DEGRADE

(71) Applicant: Ciena Corporation, Hanover, MD (US)

(72) Inventors: Marc Holness, Nepean (CA); Ashesh Mishra, San Jose, CA (US); Eric S. Davison, Peppard Common (GB)

(73) Assignee: Ciena Corporation, Hanover, MD (US)

( * ) Notice: Subject to any disclaimer, the term of this patent is extended or adjusted under 35 U.S.C. 154(b) by 111 days.

(21) Appl. No.: 15/159,196

(22) Filed: May 19, 2016

(65) Prior Publication Data
US 2017/0339028 A1   Nov. 23, 2017

(51) Int. Cl.
*H04L 12/24* (2006.01)
*G06F 11/07* (2006.01)
*H04L 12/931* (2013.01)
*H04L 12/26* (2006.01)
*H04L 12/939* (2013.01)

(52) U.S. Cl.
CPC ........ *H04L 41/5025* (2013.01); *G06F 11/076* (2013.01); *G06F 11/0709* (2013.01); *H04L 43/08* (2013.01); *H04L 43/16* (2013.01); *H04L 49/354* (2013.01); *H04L 49/555* (2013.01)

(58) Field of Classification Search
CPC . H04L 41/5025; H04L 49/354; H04L 49/555; G06F 11/0709; G06F 11/076; G06F 11/042
See application file for complete search history.

(56) References Cited

U.S. PATENT DOCUMENTS

| | | | |
|---|---|---|---|
| 7,499,407 B2 | 3/2009 | Holness et al. | |
| 7,590,054 B1 | 9/2009 | Holness et al. | |
| 7,596,094 B2* | 9/2009 | Puppa | H04L 12/5601 370/236 |
| 8,126,408 B2* | 2/2012 | Ahrony | H04B 7/0689 370/204 |
| 8,295,175 B2 | 10/2012 | Ellis et al. | |
| 8,509,061 B2 | 8/2013 | Holness et al. | |
| 8,509,063 B1 | 8/2013 | Davison et al. | |

(Continued)

OTHER PUBLICATIONS

Ram et al., "SD detection and protection triggering in MPLS-TP draft-rkhd-mpls-tp-sd-03.txt", MPLS Working Group, Nov. 2011, pp. 1-9.

(Continued)

*Primary Examiner* — Jamal Javaid
(74) *Attorney, Agent, or Firm* — Clements Bernard Walker PLLC; Christopher L. Bernard; Lawrence A. Baratta, Jr.

(57) ABSTRACT

A method of protection switching in a packet network based on signal/service degrade includes monitoring a packet network connection; detecting the packet network connection has a signal/service degrade including a condition where the packet network connection is operational, but experiencing errors below a threshold; and responsive to detection of the signal/service degrade one or more of notifying nodes in the packet network and performing a protection switch based on the signal/service degrade. The signal/service degrade is detected through one or more of i) determining a Frame Error Rate imputed from one or more of Bit Error Rate, frame events, and frame losses; ii) frame delay measurements; and iii) a combination thereof.

20 Claims, 19 Drawing Sheets

(56) References Cited

U.S. PATENT DOCUMENTS

| | | |
|---|---|---|
| 8,588,060 B2 | 11/2013 | Holness |
| 8,665,752 B2 | 3/2014 | Davison |
| 8,683,028 B2 | 3/2014 | Davison |
| 8,958,332 B2 | 2/2015 | Holness et al. |
| 2005/0071453 A1 | 3/2005 | Ellis et al. |
| 2005/0099949 A1 | 5/2005 | Mohan et al. |
| 2005/0099954 A1 | 5/2005 | Mohan et al. |
| 2006/0031482 A1 | 2/2006 | Mohan et al. |
| 2007/0268817 A1 | 11/2007 | Smallegange et al. |
| 2010/0135291 A1 | 6/2010 | Martin et al. |
| 2010/0157793 A1* | 6/2010 | Sajassi ................ G06F 11/2007 370/228 |
| 2012/0087252 A1* | 4/2012 | Ansorge ................ H04J 3/0623 370/249 |
| 2012/0281710 A1 | 11/2012 | Holness et al. |
| 2013/0064071 A1* | 3/2013 | Bos ................ H04L 12/437 370/223 |
| 2013/0114394 A1 | 5/2013 | Hu et al. |
| 2014/0122933 A1* | 5/2014 | Wang ................ H04L 41/5067 714/37 |
| 2014/0321260 A1 | 10/2014 | Mishra et al. |
| 2016/0020973 A1 | 1/2016 | Mishra et al. |

OTHER PUBLICATIONS

Holness, Marc, "ITU-T G-Series Supplement 52 Overview-G.8032 Usage and Operational Considerations", Joint IEEE-SA and ITU Workshop on Ethernet, Jul. 2013, pp. 1-12.
Holness, Marc, "Metro Ethernet—History and Overview: The Greater Chicago Chapter SCTE", Ciena, May 2013, pp. 1-45.
Ryoo et al., "Ethernet Ring Protection for Carrier Ethernet Networks", IEEE Communications Magazine, Sep. 2008, pp. 1-8.
Weingarten et al., "MPLS Transport Profile (MPLS-TP) Linear Protection", Internet Engineering Task Force (IETF), Oct. 2011, pp. 1-45.
"Ethernet ring protection switching", International Telecommunication Union, Aug. 2015, pp. 1-82.

* cited by examiner

PROTECTION GROUP (e.g., 1:1 PRIMARY AND BACKUP LSPs)

|    | STATE  | PRIMARY LSP L-FLAG SET | PRIMARY LSP S-FLAG SET | BACKUP LSP L-FLAG SET | BACKUP LSP S-FLAG SET | ACTION       | NEW STATE  |
|----|--------|------------------------|------------------------|-----------------------|-----------------------|--------------|------------|
| 1  | ACTIVE | N                      | N                      | N                     | N                     | NO-OP        |            |
| 2  | ACTIVE | N                      | N                      | N                     | Y                     | NO-OP        |            |
| 3  | ACTIVE | N                      | N                      | Y                     | N                     | NO-OP        |            |
| 4  | ACTIVE | N                      | N                      | Y                     | Y                     | NO-OP        |            |
| 5  | ACTIVE | N                      | Y                      | N                     | N                     | PROT SWITCH  | PROTECTED  |
| 6  | ACTIVE | N                      | Y                      | N                     | Y                     | NO-OP        |            |
| 7  | ACTIVE | N                      | Y                      | Y                     | N                     | NO-OP        |            |
| 8  | ACTIVE | N                      | Y                      | Y                     | Y                     | NO-OP        |            |
| 9  | ACTIVE | Y                      | N                      | N                     | N                     | PROT SWITCH  | PROTECTED  |
| 10 | ACTIVE | Y                      | N                      | N                     | Y                     | PROT SWITCH  | PROTECTED  |
| 11 | ACTIVE | Y                      | N                      | Y                     | N                     | NO-OP        |            |
| 12 | ACTIVE | Y                      | N                      | Y                     | Y                     | NO-OP        |            |
| 13 | ACTIVE | Y                      | Y                      | N                     | N                     | PROT SWITCH  | PROTECTED  |
| 14 | ACTIVE | Y                      | Y                      | N                     | Y                     | PROT SWITCH  | PROTECTED  |
| 15 | ACTIVE | Y                      | Y                      | Y                     | N                     | NO-OP        |            |
| 16 | ACTIVE | Y                      | Y                      | Y                     | Y                     | NO-OP        |            |

260

PROTECTION GROUP (e.g., 1:1 PRIMARY AND BACKUP LSPs)

|    | STATE | PRIMARY LSP L-FLAG SET | PRIMARY LSP S-FLAG SET | BACKUP LSP L-FLAG SET | BACKUP LSP S-FLAG SET | ACTION       | NEW STATE |
|----|-------|------------------------|------------------------|-----------------------|-----------------------|--------------|-----------|
| 17 | PROT  | N                      | N                      | N                     | N                     | REVERSION SW | ACTIVE    |
| 18 | PROT  | N                      | N                      | N                     | Y                     | REVERSION SW | ACTIVE    |
| 19 | PROT  | N                      | N                      | Y                     | N                     | REVERSION SW | ACTIVE    |
| 20 | PROT  | N                      | N                      | Y                     | Y                     | REVERSION SW | ACTIVE    |
| 21 | PROT  | N                      | Y                      | N                     | N                     | NO-OP        |           |
| 22 | PROT  | N                      | Y                      | N                     | Y                     | NO-OP        |           |
| 23 | PROT  | N                      | Y                      | Y                     | N                     | REVERSION SW | ACTIVE    |
| 24 | PROT  | N                      | Y                      | Y                     | Y                     | REVERSION SW | ACTIVE    |
| 25 | PROT  | Y                      | N                      | N                     | N                     | NO-OP        |           |
| 26 | PROT  | Y                      | N                      | N                     | Y                     | NO-OP        |           |
| 27 | PROT  | Y                      | N                      | Y                     | N                     | NO-OP        |           |
| 28 | PROT  | Y                      | N                      | Y                     | Y                     | NO-OP        |           |
| 29 | PROT  | Y                      | Y                      | N                     | N                     | NO-OP        |           |
| 30 | PROT  | Y                      | Y                      | N                     | Y                     | NO-OP        |           |
| 31 | PROT  | Y                      | Y                      | Y                     | N                     | NO-OP        |           |
| 32 | PROT  | Y                      | Y                      | Y                     | Y                     | NO-OP        |           |

| REQUEST/STATE AND STATUS | TYPE | PRIORITY |
|---|---|---|
| CLEAR | LOCAL | HIGHEST |
| FS | LOCAL | |
| R-APS(FS) | REMOTE | |
| LOCAL SF | LOCAL | |
| LOCAL CLEAR SF | LOCAL | |
| R-APS(SF) | REMOTE | |
| R-APS(MS) | REMOTE | |
| MS | LOCAL | |
| LOCAL SD | LOCAL | |
| LOCAL CLEAR SD | LOCAL | |
| R-APS(SD) | REMOTE | |
| WTR EXPIRES | LOCAL | |
| WTR RUNNING | LOCAL | |
| WTB EXPIRES | LOCAL | |
| WTB RUNNING | LOCAL | |
| R-APS(NR, RB) | REMOTE | |
| R-APS(NR) | REMOTE | LOWEST |

| INPUTS | | | OUTPUTS | |
|---|---|---|---|---|
| NODE STATE | TOP PRIORITY REQUEST | ROW | ACTIONS | NEXT NODE STATE |
| - | STATE MACHINE INITIALIZATION | | | E |
| A (IDLE) | CLEAR | | NO ACTION | A |
| | : | | | |
| | LOCAL SD | | IF DEGRADED RING PORT IS ALREADY BLOCKED:   TX R-APS(SD, DNF)   UNBLOCK NON-FAILED RING PORT ELSE:   BLOCK DEGRADED RING PORT   TX R-APS(SD)   UNBLOCK NON-FAILED RING PORT   FLUSH FDB | F |
| | LOCAL CLEAR SD | | NO ACTION | A |
| | R-APS(SD) | | UNBLOCK NON-FAILED RING PORT STOP TX R-APS | B |
| | : | | | |

| INPUTS | | | OUTPUTS | |
|---|---|---|---|---|
| NODE STATE | TOP PRIORITY REQUEST | ROW | ACTIONS | NEXT NODE STATE |
| B PROTECTION | CLEAR | | NO ACTION | B |
| | LOCAL SD | | NO ACTION | B |
| | LOCAL CLEAR SD | | NO ACTION | B |
| | R-APS(SD) | | NO ACTION | B |
| | : | | | |

| INPUTS | | | OUTPUTS | |
|---|---|---|---|---|
| NODE STATE | TOP PRIORITY REQUEST | ROW | ACTIONS | NEXT NODE STATE |
| C MANUAL SWITCH | CLEAR | | NO ACTION | E |
| | LOCAL SD | | NO ACTION | C |
| | LOCAL CLEAR SD | | NO ACTION | C |
| | R-APS(SD) | | NO ACTION | C |
| | : | | | |

| INPUTS | | | OUTPUTS | |
|---|---|---|---|---|
| NODE STATE | TOP PRIORITY REQUEST | ROW | ACTIONS | NEXT NODE STATE |
| D FORCE SWITCH | CLEAR | | NO ACTION | E |
| | LOCAL SD | | NO ACTION | D |
| | LOCAL CLEAR SD | | NO ACTION | D |
| | R-APS(SD) | | NO ACTION | D |
| | : | | | |

*FIG. 16*

| INPUTS | | | OUTPUTS | |
|---|---|---|---|---|
| NODE STATE | TOP PRIORITY REQUEST | ROW | ACTIONS | NEXT NODE STATE |
| E PENDING | CLEAR | | NO ACTION | E |
| | : | | | |
| | LOCAL SD | | IF DEGRADED RING PORT IS ALREADY BLOCKED:   TX R-APS(SD, DNF)   UNBLOCK NON-FAILED RING PORT ELSE:   BLOCK DEGRADED RING PORT   TX R-APS(SD)   UNBLOCK NON-DEGRADED RING PORT   FLUSH FDB IF RPL OWNER NODE:   STOP WTR   STOP WTB | F |
| | LOCAL CLEAR SD | | NO ACTION | D |
| | R-APS(SD) | | UNBLOCK NON-DEGRADED RING PORT STOP TX R-APS IF RPL OWNER NODE:   STOP WTR   STOP WTB | F |
| | : | | | |

| INPUTS | | | OUTPUTS | |
|---|---|---|---|---|
| NODE STATE | TOP PRIORITY REQUEST | ROW | ACTIONS | NEXT NODE STATE |
| F DEGRADED | CLEAR | | NO ACTION | F |
| | FS | | IF REQUESTED RING PORT IS ALREADY BLOCKED:   TX R-APS(SD, DNF)   UNBLOCK NON-REQUESTED RING PORT ELSE:   BLOCK DEGRADED RING PORT   TX R-APS(SD)   UNBLOCK NON-REQUESTED RING PORT   FLUSH FDB | D |
| | R-APS(FS) | | UNBLOCK RING PORTS STOP TX R-APS | D |
| | LOCAL SF | | IF FAILED RING PORT IS ALREADY BLOCKED:   TX R-APS(SD, DNF)   UNBLOCK NON-FAILED RING PORT ELSE:   BLOCK FAILED RING PORT   TX R-APS(SD)   UNBLOCK NON-FAILED RING PORT   FLUSH FDB | B |
| | LOCAL CLEAR SF | | START GUARD TIMER TX R-APS(NR) IF RPL OWNER NODE AND REVERTIVE MODE:   START WTR | E |
| | R-APS(SF) | | NO ACTION | F |
| | R-APS(MS) | | NO ACTION | F |
| | MS | | NO ACTION | F |
| | LOCAL SD | | NO ACTION | F |
| | LOCAL CLEAR SD | | NO ACTION | F |
| | R-APS(SD) | | NO ACTION | F |
| | WTR EXPIRES | | NO ACTION | F |
| | WTR RUNNING | | NO ACTION | F |
| | WTB EXPIRES | | NO ACTION | F |
| | WTB RUNNING | | NO ACTION | F |
| | R-APS(NR, RB) | | NO ACTION | F |
| | R-APS(NR) | | IF RPL OWNER NODE AND REVERTIVE MODE:   START WTR | E |

*FIG. 18*

PROTECTION SWITCHING SYSTEMS AND METHODS IN A PACKET NETWORK BASED ON SIGNAL DEGRADE

FIELD OF THE DISCLOSURE

The present disclosure generally relates to packet networking systems and methods. More particularly, the present disclosure relates to protection switching systems and methods in a packet network based on Signal/Service Degrade (SD).

BACKGROUND OF THE DISCLOSURE

Various conventional approaches in Ethernet, Multiprotocol Label Switching (MPLS), and the like for protection switching with the objective of resiliency and redundancy at the packet layer. There has been work in the Internet Engineering Task Force (IETF) to define/extend Protection State Coordination (PSC) linear protection schemes for MPLS-Transport Profile (TP). This is described in IETF draft-rkhd-mpls-tp-sd-03.txt entitled "SD detection and protection triggering in MPLS-TP" (11/2011) and RFC 6378 entitled "MPLS Transport Profile (MPLS-TP) Linear Protection" (10/2011), the contents of each is incorporated by reference. These approaches utilize SD condition detection techniques at the physical/server layer, not at the packet layer. Also, these approaches assume there is a PSC protocol governing the protection logic. Ethernet ring protection switching is described in ITU-T G.8032/Y.1344 (08/2015) and (02/2012) entitled "Ethernet ring protection switching," the contents of which are incorporated by reference. Conventionally, there are no approaches in G.8032 for handling signal degrade ring protection switching. Further, in Link Aggregation Groups (LAG), such as defined in IEEE 802.1AX-2008 entitled "Link Aggregation," the contents of which are incorporated by reference, there is no signal degrade condition detection and interactions in support of LAG members switching.

As Time Division Multiplexing (TDM) networks transition to packet-based networks (e.g., Ethernet, MPLS, etc.), there is a need to support signal/service degrade detection mechanisms and provide protection switching around the degraded network connection. Traditional Bit Error Rate (BER) measurements used for SD detection common to TDM networks (Optical Transport Network (OTN), Synchronous Optical Network (SONET), Synchronous Digital Hierarchy (SDH), etc.) are very difficult to achieve within a packet/frame transport network since packet networks use a forwarding currency of frames/packets instead of bits.

BRIEF SUMMARY OF THE DISCLOSURE

In an exemplary embodiment, a method of protection switching in a packet network based on signal/service degrade includes monitoring a packet network connection; detecting the packet network connection has a signal/service degrade including a condition where the packet network connection is operational, but experiencing errors below a threshold; and responsive to detection of the signal/service degrade, performing one or more of notifying nodes in the packet network and performing a protection switch based on the signal/service degrade. The signal/service degrade can be detected through one or more of i) determining a Frame Error Rate inferred from one or more of Bit Error Rate, frame events, and frame losses; ii) determining frame delay measurements; and iii) a combination thereof. The packet network connection can include one or more of a Label Switched Path (LSP), a Link Aggregation Group (LAG) member, a G.8032 ring span, a Virtual Local Area Network (VLAN), and a tunnel. The protection switch can be performed if a backup connection is active and has either a less severe signal/service degrade or no signal/service degrade thereon. The notifying can include one of providing a signal/service degrade indication in an Alarm Indication Signal (AIS), providing the signal/service degrade indication in a Ring-Automatic Protecting Switching (R-APS) message, providing the signal/service degrade indication via Link Aggregation Control Protocol (LACP), and cessation of exchange of LACP. The packet network connection can include a Link Aggregation Group (LAG) member, wherein the protection switch can include forcing a member with the signal/service degrade into a non-distributing/collecting state, and the notifying utilizes Link Aggregation Control Protocol (LACP). The packet network connection can include a Label Switched Path (LSP), wherein the notifying can include transmitting Alarm Indication Signal (AIS) over the LSP, and wherein the protection switch can include a switch at a Label Edge Router to a backup connection. The protection switch can include blocking a port on the G.8032 ring span, and the notifying can include transmitting a Ring-Automatic Protecting Switching (R-APS) message.

In another exemplary embodiment, an apparatus for protection switching in a packet network based on signal/service degrade includes circuitry adapted to monitor a packet network connection; circuitry adapted to detect the packet network connection has a signal/service degrade including a condition where the packet network connection is operational, but experiencing errors below a threshold; and circuitry, responsive to detection of the signal/service degrade, adapted to one or more of notify nodes in the packet network and perform a protection switch based on the signal/service degrade. The signal/service degrade can be detected through one or more of i) a Frame Error Rate determination inferred from one or more of Bit Error Rate, frame events, and frame losses; ii) frame delay measurements; and iii) a combination thereof. The packet network connection can include one or more of a Label Switched Path (LSP), a Link Aggregation Group (LAG) member, a G.8032 ring span, a Virtual Local Area Network (VLAN), and a tunnel. The protection switch can include performed if a backup connection is active and has either a less severe signal/service degrade or no signal/service degrade thereon. A notification can include one of a signal/service degrade indication in an Alarm Indication Signal (AIS), the signal/service degrade indication in a Ring-Automatic Protecting Switching (R-APS) message, the signal/service degrade indication via Link Aggregation Control Protocol (LACP), and cessation of exchange of LACP. The packet network connection can include a Link Aggregation Group (LAG) member, wherein the protection switch can include forcing a member with the signal/service degrade into a non-distributing/collecting state, and a notification utilizes Link Aggregation Control Protocol (LACP). The packet network connection can include a Label Switched Path (LSP), wherein a notification can include an Alarm Indication Signal (AIS) transmitted over the LSP, and wherein the protection switch can include a switch at a Label Edge Router to a backup connection. The packet network connection can include a G.8032 ring span, wherein the protection switch can include a blocked port on the G.8032 ring span, and a notification can include a Ring-Automatic Protecting Switching (R-APS) message.

In a further exemplary embodiment, a node in a packet network adapted for protection switching based on signal/service degrade includes a plurality of ports communicatively coupled to the packet network; a controller communicatively coupled to the plurality ports, wherein the controller is adapted to monitor a packet network connection on one of the plurality of ports, detect the packet network connection has a signal/service degrade including a condition where the packet network connection is operational, but experiencing errors below a threshold, and responsive to detection of the signal/service degrade, one or more of notify nodes in the packet network and perform a protection switch based on the signal/service degrade. The signal/service degrade can be detected through one or more of i) a Frame Error Rate determination inferred from one or more of Bit Error Rate, frame events, and frame losses; ii) frame delay measurements; and iii) a combination thereof. The packet network connection can include one or more of a Label Switched Path (LSP), a Link Aggregation Group (LAG) member, a G.8032 ring span, a Virtual Local Area Network (VLAN), and a tunnel. A notification can include one of a signal/service degrade indication in an Alarm Indication Signal (AIS), the signal/service degrade indication in a Ring-Automatic Protecting Switching (R-APS) message, and the signal/service degrade indication via Link Aggregation Control Protocol (LACP).

BRIEF DESCRIPTION OF THE DRAWINGS

The present disclosure is illustrated and described herein with reference to the various drawings, in which like reference numbers are used to denote like system components/method steps, as appropriate, and in which:

FIG. 10 is tables of examples of active state protection switching logic and protected state protection switching logic in an MPLS network with 16 1:1 primary and backup Label Switched Paths (LSPs);

FIG. 14 is a table of G.8032 SD priority for use with the G.8032 protection switching process of FIG. 11 and the G.8032 ring of FIG. 12;

FIGS. 15-17 are tables of G.8032 Protocol State Machine Extensions for use with the G.8032 protection switching process of FIG. 11 and the G.8032 ring of FIG. 12;

FIG. 18 is a table of G.8032 Protocol State Machine Signal Degrade State for use with the G.8032 protection switching process of FIG. 11 and the G.8032 ring of FIG. 12.

DETAILED DESCRIPTION OF THE DISCLOSURE

Again, in various exemplary embodiments, the present disclosure relates to protection switching systems and methods in a packet network based on Signal Degrade (SD). The systems and methods leverage accepted and standardized performance monitoring protocols to determine degradation of performance of network connections within a packet network, i.e., SD. Further, the systems and methods describe techniques to communicate the detection of signal/service degrade conditions over a network segment to perform protection switching around the degraded network connection. The systems and methods are described with reference to MPLS, IEEE 802.3ah Connectivity Fault Management (CFM), ITU-T G.8031/Y.1731, LAGs, G.8032, and the like. Generally, the systems and methods introduce the concept of signal/service degrade conditions in packet networking as a trigger for protection switching. In MPLS, the systems and methods introduce a signal degrade indication and a signal degrade level/severity in MPLS Alarm Indication Signal (AIS) messages. The systems and methods can utilize Ethernet in the First Mile (EFM)/Link Operations, Administration, and Maintenance (OAM) errored frame events to infer signal degrade conditions over a link within a packet network. In LAGs, the systems and methods apply the signal degrade condition detection over LAG members to trigger LAG member switching. In MPLS, the systems and methods apply the signal degrade condition detection over a link within an MPLS Label Switched Path (LSP) to trigger LSP protection switching by supported Label Edge Routers (LERs). Also, in G.8032, the systems and methods apply the signal degrade condition detection over a ring span within a G.8032 ring, for modifying channel blocks therein. Of course, those of ordinary skill in the art will recognize the systems and methods can be applied in any packet protection switching scheme that supports some manner of OAM monitoring for detecting SD and some notification technique to support downstream/upstream SD signaling.

Bit Error Rate (BER) to Frame Error Rate (FER) Relationship

Figure 1:
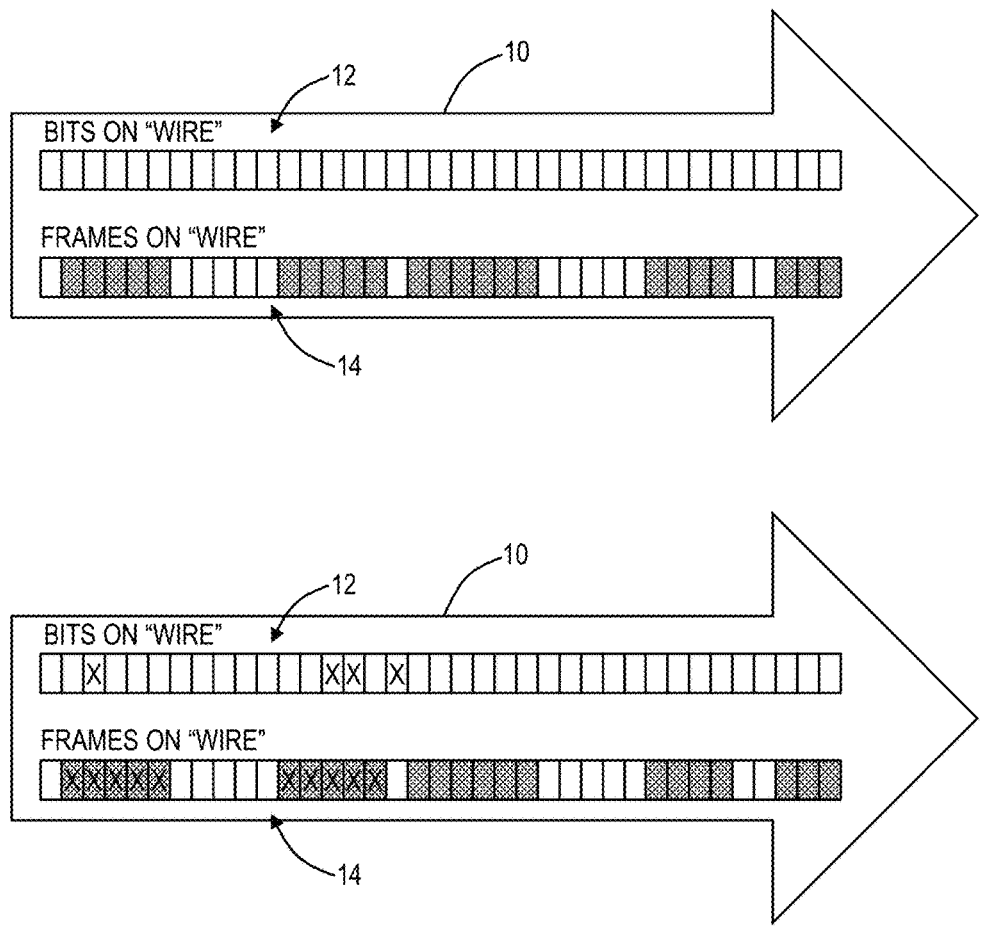
FIG. 1 is a logical diagram of a connection with associated bits on a "wire" and frames on the "wire" for illustrating a correlation between Bit Error Rate (BER) and Frame Error Rate (FER)

Referring to FIG. 1, in an exemplary embodiment, a logical diagram illustrates a connection 10 with associated bits 12 on a "wire" and frames 14 on the "wire." The "wire" denotes a physical layer where the bits 12 and the frames 14 are transmitted. In the top portion of FIG. 1, the bits 12 and the frames 14 are transmitted error free, and in the bottom portion of FIG. 1, there are bit errors in the bits 12, which create corresponding frame errors in the frames 14. The errors are denoted by an "X" in the bits 12 or the frames 14. In FIG. 1, for example, a BER of four bit errors per ranges is reflected as two frame errors per range. Thus, there is a correlation between FER and BER over the connection 10, and the FER can be used to indicate a service degrade condition. For example, assuming that the bit errors are independent of each other, then the expectation value of the FER, (for a data packet length of L bits), can be expressed as $FER \approx (1-BER)^L$. The following table provides an example correlation between FER and BER:

| BER | Frame Size (bytes) | FER |
|---|---|---|
| $10^{-8}$ | 64 | $5.2 \times 10^{-6}$ |
|  | 512 | $4.10 \times 10^{-5}$ |
|  | 1522 | $1.22 \times 10^{-4}$ |
|  | 9216 | $7.37 \times 10^{-4}$ |

From the above, it can be seen the correlation is based on the frame size with a larger frame size having a higher FER for the same BER since larger frame sizes have more bits correspondingly and are thus affected more by bit errors. Consequently, FER can be used to infer a [reliable] signal/service degrade indication within a Packet Network. Additionally, other performance metrics (such as frame delay, frame delay variation, availability, compound metrics, etc.) can be used to infer signal/service degrade within a Packet Network, individually or in combination with FER. Note, as described herein, SD can refer to a signal/service degrade condition, i.e., the "S" can be signal or service. The SD indicates a condition where the signal or service is operational, but experiencing errors, e.g., FER, below some threshold. The signal or service is still operational, i.e., not a Signal Fail (SF), but is experiencing some degradation where it would be advantageous to implement protection switching. To that end, protection switching based on SD before SF provides additional resiliency and service protection, i.e., more up time. Thus, the systems and methods introduce the concept of SD-based protection switching in packet networks, using various protection switching techniques.

Figure 2:
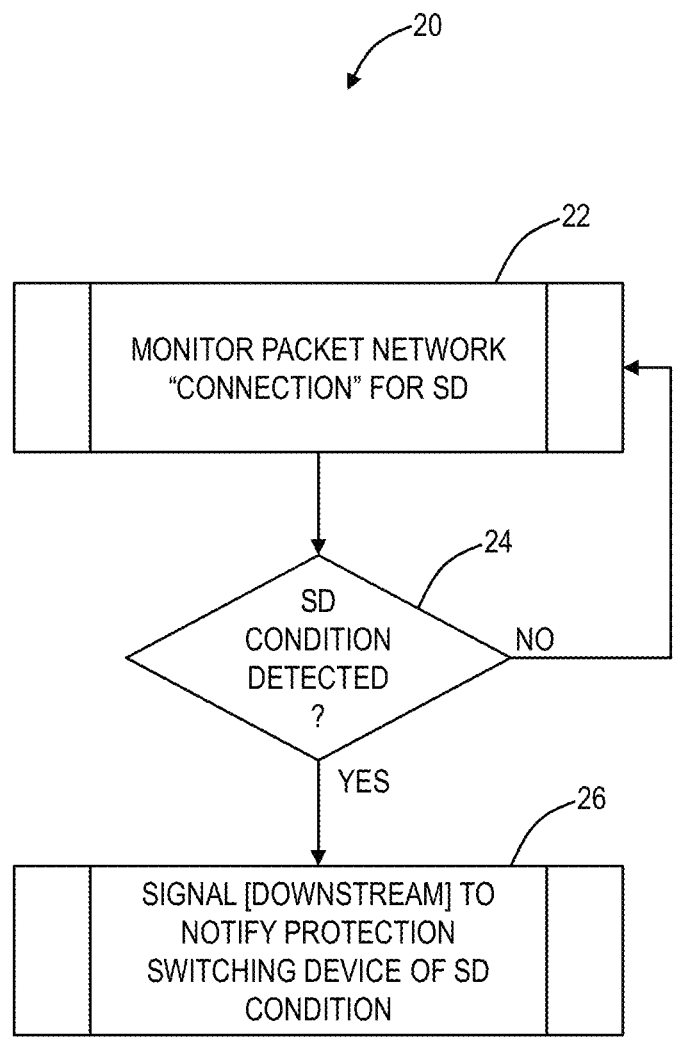
FIG. 2 is a flowchart of a signal/service degrade connection monitoring process in a packet network.

Signal/Service Degrade Connection Monitoring and Protection Switching Triggering Referring to FIG. 2, in an exemplary embodiment, a flowchart illustrates a signal/service degrade connection monitoring process 20. The connection monitoring process 20 is implemented by a node in a packet network on each packet network "connection." The connection can be any identifiable packet connection that supports protection switching and supports OAM monitoring including, for example, an LSP, a LAG member, a G.8032 link, a Virtual Local Area Network (VLAN), a tunnel, or the like. The connection monitoring process 20 includes monitoring the packet network connection for an SD condition (step 22), and if the SD condition is detected (step 24), the connection monitoring process 20 includes signaling [downstream] to notify a protection switching device of the SD condition (step 26). That is, the connection monitoring process 20 performs both detection of the SD condition based on the OAM monitoring and remote notification of the SD condition, such as using various techniques described herein. The connection monitoring process 20 is described in a general manner, independent of packet technology and associated notification processes. The foregoing description provides detailed examples with respect to MPLS, G.8032, and LAG; although other packet technologies that support protection switching and notifications are also contemplated.

Figure 3:
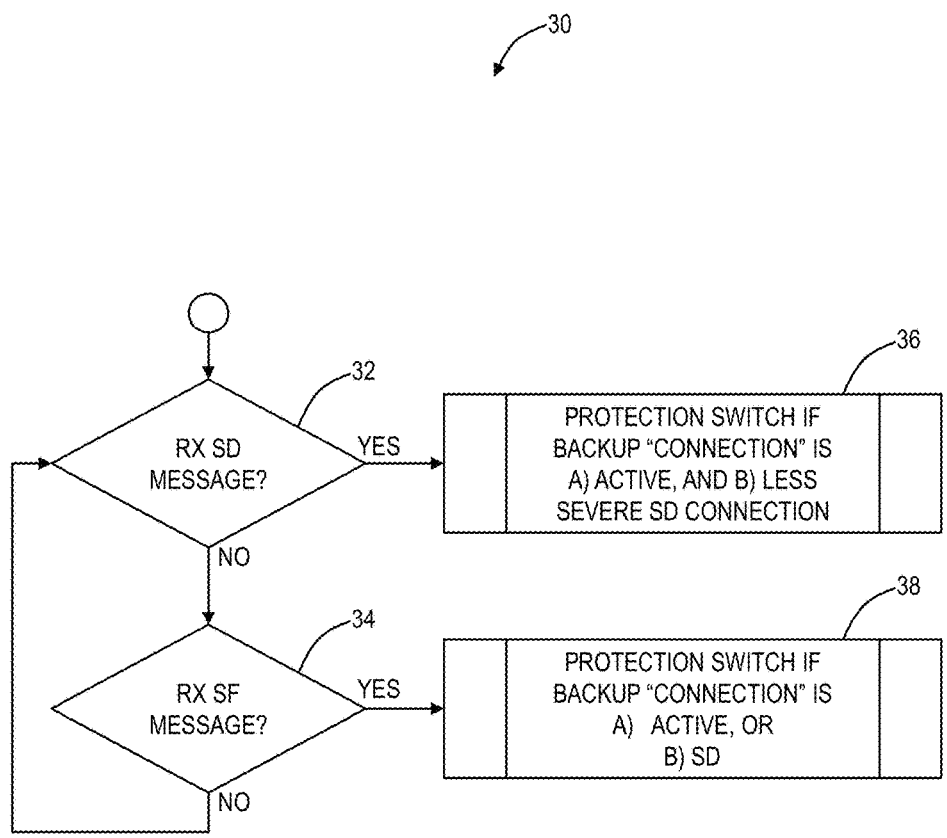
FIG. 3 is a flowchart of a signal/service degrade protection switching triggering process in a packet network.

Referring to FIG. 3, in an exemplary embodiment, a flowchart illustrates a signal/service degrade protection switching triggering process 30. The protection switching triggering process 30 can be used with the connection monitoring process 20, subsequent to step 26 and the signaling of the SD condition. The protection switching triggering process 30, similar to the connection monitoring process 20, is implemented by the node. The protection switching triggering process 30 is triggered by the receipt of an SD message (step 32) or an SF message (step 34). If the SD message is received (step 32), the protection switching triggering process 30 includes causing a protection switch if a backup "connection" is a) active and b) has a less severe SD condition or no SD (step 36). If the SF message is received (step 34), the protection switching triggering process 30 includes causing a protection switch if the backup "connection" is a) active or b) has an SD condition (step 38). Here, the backup "connection" is a protection connection for the monitored packet network "connection." The protection switching triggering process 30 includes protection switching based on SD to an active and less severe SD connection and based on SF to an active connection or a connection with SD (since SD is better than SF).

Signal/Service Degrade (SD) Condition Detection

SD is determined by monitoring the performance of connection, e.g., OAM monitoring. For a generalized packet port, SD can be a port degrade or a connection degrade which is either True or False. The port degrade and/or the connection degrade can be used as an SD trigger. The port degrade is, given a designated window/duration (D) and threshold (T):

$$\text{Port Degrade} = \begin{cases} \text{False,} & \frac{FrameRxError}{FrameRx} < T \\ \text{True,} & \frac{FrameRxError}{FrameRx} \geq T \end{cases}$$

In IEEE 802.3ah, the SD can use errored frame events to determine FER. In ITU-T G.8031/Y.1731 "OAM functions and mechanisms for Ethernet based networks" (08/15), the contents of which are incorporated by reference, an Ethernet Loss Measurement (ETH-LM) using Loss Measurement Messages (LMMs) and Loss Measurement Replies (LMRs) can compute a Frame Loss Ratio (FLR) to determine FER. In ITU-T G.8031/Y.1731, an Ethernet Synthetic Loss Measurement (ETH-SLM) using Synthetic Loss Messages (SLMs) and Synthetic Loss Replies (SLR) can compute the FLR to determine FER. Once the FER is determined, a connection degrade can be used to trigger SD where, given a designated window/duration (D), and threshold (T):

$$\text{Connection Degrade} = \begin{cases} \text{False,} & FER < T \\ \text{True,} & FER \geq T \end{cases}$$

In ITU-T G.8031/Y.1731), an Ethernet Delay Measurement (ETH-DM) using Delay Measurement Messages (DMMs) and Delay Reply Messages (DMRs) or a single Delay Measurement (1DM), Frame Delay (FD), Frame Delay Range (FDR), and/or Inter-Frame Delay Variation (IFDV) can be computed. Similarly, a connection degrade based on the ETH-DM can be used to trigger SD where, given a designated window/duration (D), and threshold (T):

$$\text{Connection Degrade} = \begin{cases} \text{False}, & (FD|FDR|FDV) < T \\ \text{True}, & (FD|FDR|FDV) \geq T \end{cases}$$

In the foregoing, the designated window/duration (D) is a monitoring interval, i.e., a time period, such as every X sec. The threshold (T) determines a condition leading to the port degrade, or the connection degrade. The threshold (T) can be set at a default value, can be changed for different Service Level Agreements (SLAs), can be modified based on operational data, and the like. Thus, the combination of exceeding the threshold (T) during the designated window/duration (D) can be characterized as a degraded condition for a particular connection. Those of ordinary skill in the art will recognize such a determination can be variable based on various parameters.

Also, a compound calculation can also be used based on various combinations of the above along with other OAM monitoring techniques. Thus, the SD condition can be triggered based on the above or any other identifiable technique in packet monitoring.

Protection Switching Via SD in LAG

Figure 4:
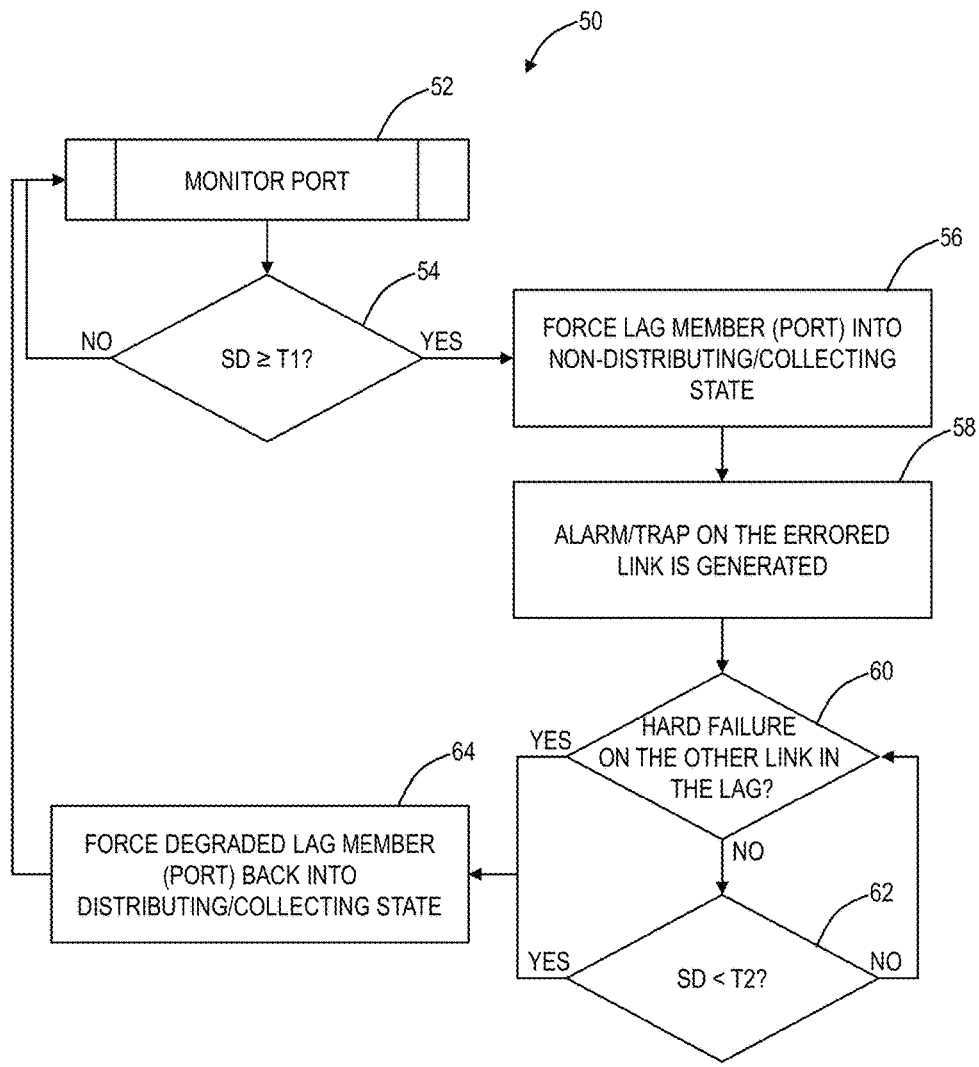
FIG. 4 is a flowchart of a Link Aggregation Group (LAG) member protection switching process using the Signal/Service Degrade (SD) condition.

Referring to FIG. 4, in an exemplary embodiment, a flowchart illustrates a LAG member protection switching process 50 using the SD condition. Link aggregation refers to various techniques of combining (aggregating) multiple packet connections in parallel in order to increase the overall throughput beyond a single connection as well as providing redundancy in case one of the links fails. The LAG combines a number of physical ports together to make a single high-bandwidth data path, so as to implement the traffic load sharing among the member ports in the group and to enhance the connection reliability. With respect to LAG, other umbrella terms used to describe these techniques include port trunking, link bundling, Ethernet/network/NIC bonding, or NIC teaming. These umbrella terms encompass not only vendor-independent standards such as Link Aggregation Control Protocol (LACP) for Ethernet defined in IEEE 802.1AX and IEEE 802.1aq or the previous IEEE 802.3ad, but also various proprietary solutions. A LAG includes a plurality of links, each in either a distributing/collecting state or a non-distributing/collecting state.

The LAG member protection switching process 50 includes monitoring a port in a LAG (step 52) to detect an SD condition greater than or equal to a first threshold (T1) (step 54). Responsive to detecting the SD condition on a particular port, the LAG member protection switching process 50 includes forcing the LAG member (associated with the particular port) into the non-distributing/collecting state (step 56) and causing generation of an alarm/trap on the errored link (step 58). In the LAG, the port (member) is the packet network "connection." The alarm/trap is for a management system, such as a Network Management System (NMS), Element Management System (EMS), or the like, to notify network operators of the condition. Also, the LAG member protection switching process 50 includes monitoring to ensure there are no additional failures in the LAG. Specifically, if there are hard failures (e.g., SF) on other links in the LAG (step 60) or if the SD condition is less than a second threshold (T2) (step 62), the LAG member protection switching process 50 includes forcing the degraded LAG member (port) back into the distributing/collecting state (step 64). That is, the LAG can accept the LAG member (port) with the SD condition if necessary, i.e., there are other failures in the LAG or if the SD is minor (less than T2).

Figure 5:
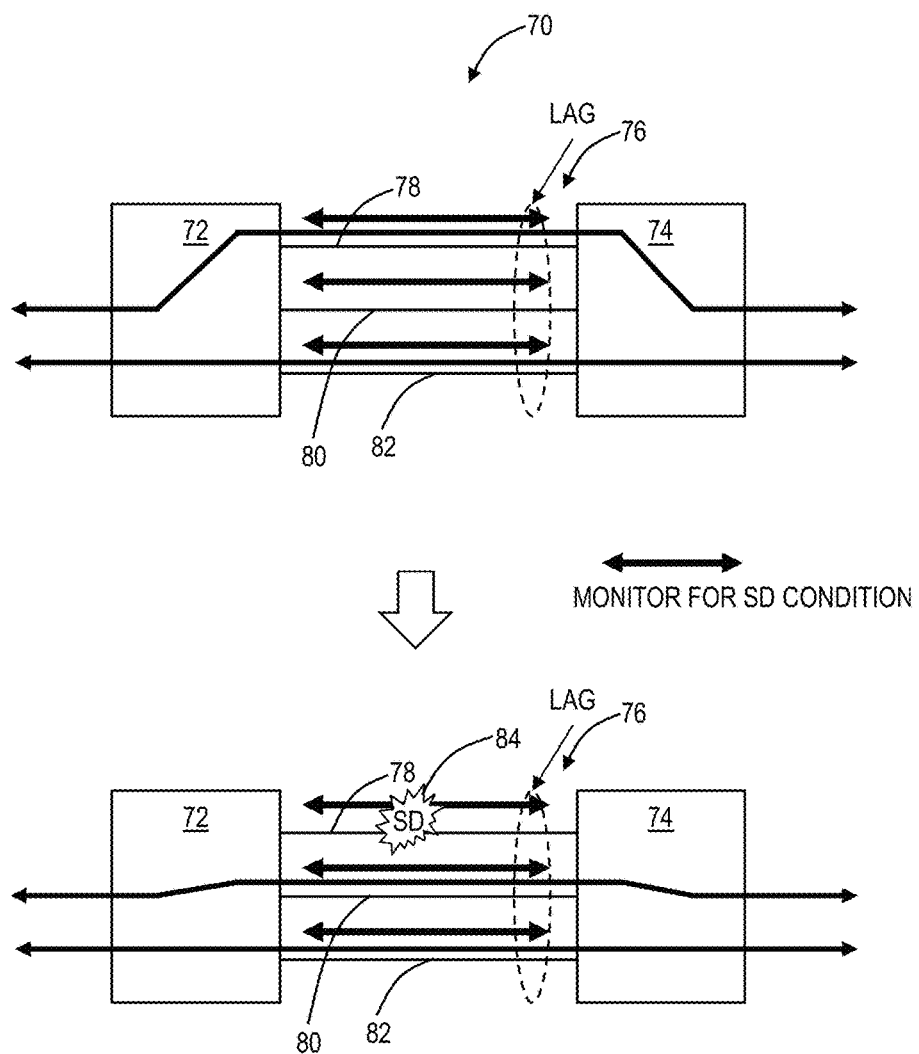
FIG. 5 is a network diagram of a network with two nodes in a LAG configuration for illustrating the LAG member protection switching process of FIG. 4.

Referring to FIG. 5, in an exemplary embodiment, a network diagram illustrates a network 70 with two nodes 72, 74 in a LAG 76 configuration for illustrating the LAG member protection switching process 50. In this example, the LAG 76 includes three members 78, 80, 82; of course, other embodiments are also contemplated. In a top portion of FIG. 5, the LAG 76 has the two members 78, 82 in a collecting/distributing state. In the bottom portion of FIG. 5, the LAG 76 has the member 78 experience an SD condition 84. Once the SD condition 84 is detected, the nodes 72 will adjust the LAG frame distribution function to exclude frames from transmission on the member 78. The member 78 can be signaled to the peer end of the LAG 76, i.e., from the node 72 to the node 74, via LACP of the like. Also, subsequent to the signaling, there can be a cessation of exchange of LACP based on the SD condition 84.

Each of the nodes 72, 74 is configured to monitor each of the members 78, 80, 82 for the SD condition 84. Again, the SD condition 84 can be based upon FER calculations using IEEE 802.3ah (EFM/Link OAM) frame error events and counters exceeding a threshold, FER calculations using ITU-T Y.1731 ETH-LM (LMM/LMR) frame loss ratio measurements exceeding a threshold, FER calculations using ITU-T Y.1731 ETH-SLM (SLM/SLR) frame loss ratio measurements exceeding a threshold, FD/FDV calculations using ITH-T Y.1731 ETH-DM (DMM/DMR or 1DM) exceeding a threshold, a combination of the foregoing, or the like.

Protection Switching Via SD in MPLS

Figure 6:
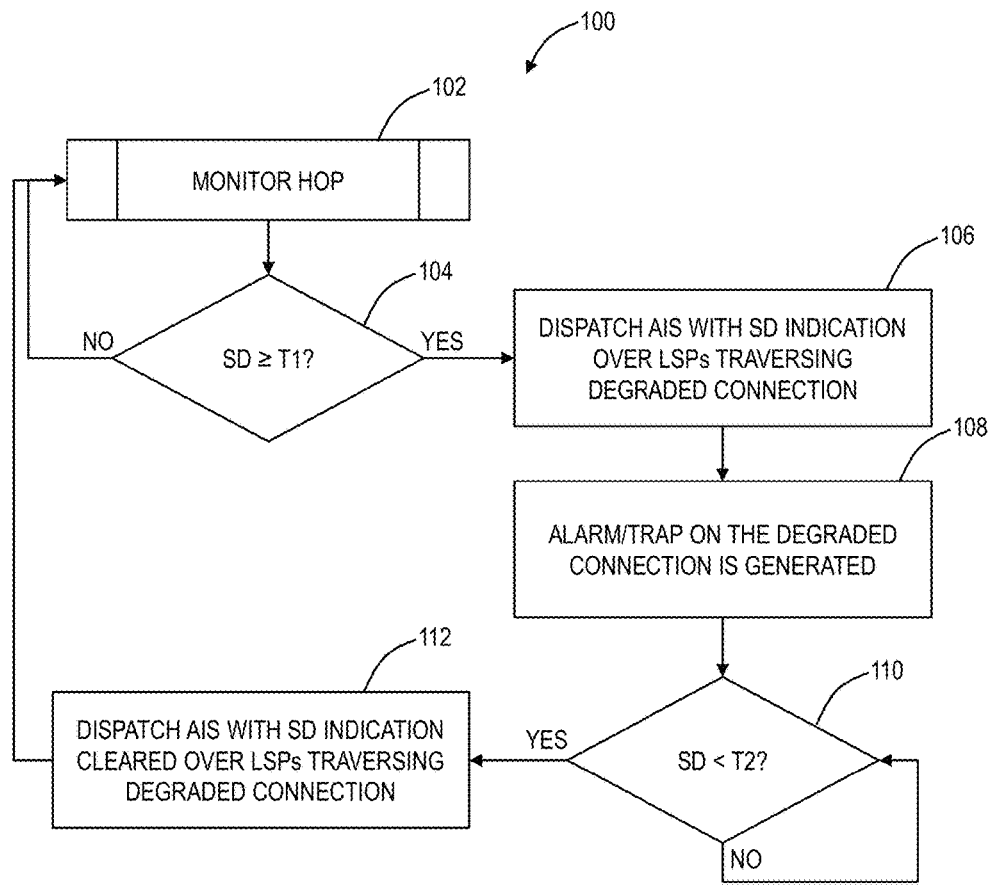
FIG. 6 is a flowchart of a Link Edge Router (LER) SD triggering protection switching process 130

Referring to FIG. 6, in an exemplary embodiment, a flowchart illustrates an MPLS protection switching process 100 using the SD condition. In MPLS, MPLS Fast Reroute (also called MPLS local restoration or MPLS local protection) is a local restoration network resiliency mechanism. It is a feature of Resource Reservation Protocol (RSVP) Traffic Engineering (RSVP-TE). In MPLS local protection each label switched path (LSP) passing through a facility is protected by a backup path which originates at the node immediately upstream to that facility. MPLS can utilize AIS messages such as described in RFC 6427 "MPLS Fault Management Operations, Administration, and Maintenance (OAM)," (11/20011), and RFC 6371 "Operations, Administration, and Maintenance Framework for MPLS-Based Transport Networks," (09/2011), the contents of which are incorporated by reference. AIS messages are notifications that are originated by intermediate nodes triggered by server-layer events.

The MPLS protection switching process 100 includes monitoring a hop (step 102) to detect an SD condition greater than or equal to a first threshold (T1) (step 104). In MPLS, the hop or link is the packet network "connection." Subsequent to the SD condition (step 74), the MPLS protection switching process 100 includes dispatching (transmitting) an AIS with an SD indication over LSPs traversing the degraded connection (step 106). Here, the AIS messages in MPLS are adapted to include an additional notification regarding SD. Further, the MPLS protection switching process 100 includes generating an alarm/trap on the degraded connection (step 108). The alarm/trap is for a management system, such as an NMS, an EMS, or the like, to notify network operators of the condition. Also, the MPLS protection switching process 100 includes monitoring the hop to determine when the SDN condition is less than a second threshold (T2) (step 110) which would indicate the hop is no longer degraded. Note, the first threshold (T1) could be the same or different from the second threshold (T2). The second threshold (T2) could be different to indicate recovery from the initial SD condition. If the SDN condition is less than the second threshold (step 110), the MPLS protection switching process 100 includes dispatching (transmitting) an AIS with an SD indication cleared over the LSPs traversing the previously degraded connection (step 112).

Figure 7:
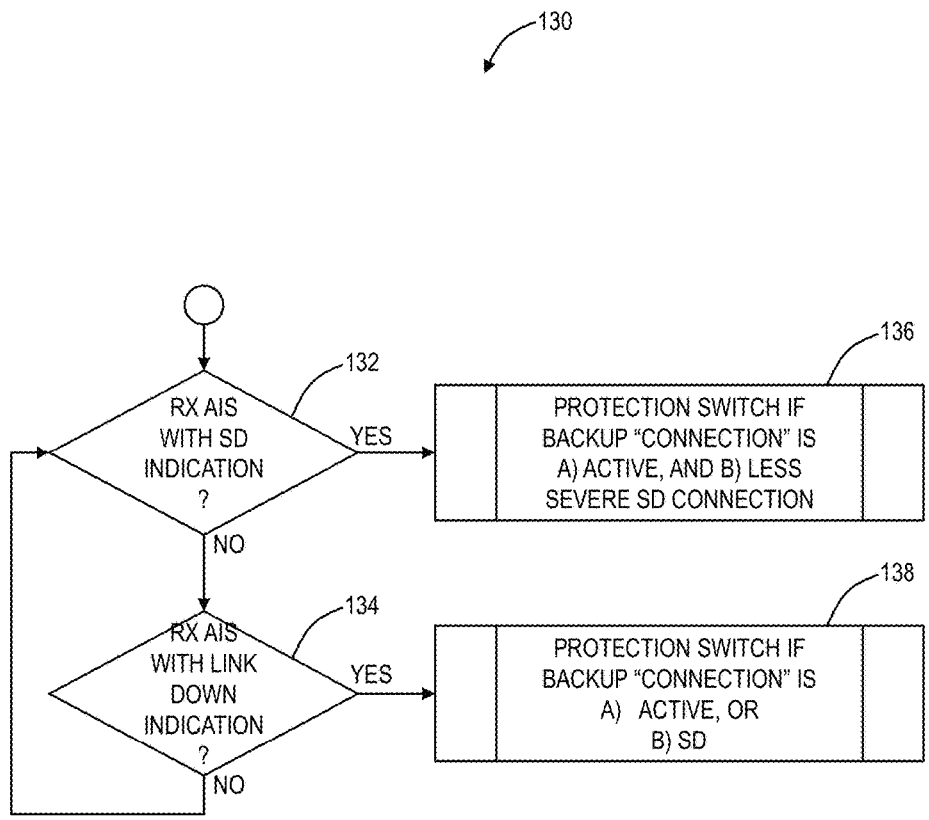
FIG. 7 is a flowchart of a Multiprotocol Label Switching (MPLS) protection switching process using the SD condition.

Referring to FIG. 7, in an exemplary embodiment, a flowchart illustrates an LER SD triggering protection switching process 130. The LER SD triggering protection switching process 130 is implemented by an LER, based on the AIS messages from the MPLS protection switching process 100. In MPLS, a Label Switch Router (LSR) or a transit router is an MPLS router that performs routing based only on the label. The LSR is located in the middle of an MPLS network, i.e., an intermediate node. The LSR is responsible for switching the labels used to route packets. When an LSR receives a packet, it uses the label included in the packet header as an index to determine the next hop on the LSP and a corresponding label for the packet from a lookup table. The old label is then removed from the header and replaced with the new label before the packet is routed forward. The LER (also known as edge LSR) is a router that operates at the edge of an MPLS network and acts as the entry and exit points for the network. LERs respectively, push an MPLS label onto an incoming packet and pop it off the outgoing packet. When forwarding packets into the MPLS domain, an LER uses routing information to determine appropriate labels to be affixed, labels the packet accordingly, and then forwards the labeled packets into the MPLS domain. Likewise, upon receiving a labeled packet which is destined to exit the MPLS domain, the LER strips off the label and forwards the resulting packet using normal forwarding rules.

The LER SD triggering protection switching process 130 initiates with the LER receiving an AIS with an SD indication (step 132) or receiving an AIS with a Link Down notification (step 134). If the AIS with an SD indication is received (step 132), the LER SD triggering protection switching process 130 includes causing a protection switch if a backup "connection" is a) active and b) has a less severe SD condition or no SD (step 136). If the AIS with a Link Down notification is received (step 134), the LER SD triggering protection switching process 130 includes causing a protection switch if the backup "connection" is a) active or b) has an SD condition (step 138). Here, the backup "connection" is another path through the MPLS network avoiding the degraded hop.

Figure 8:
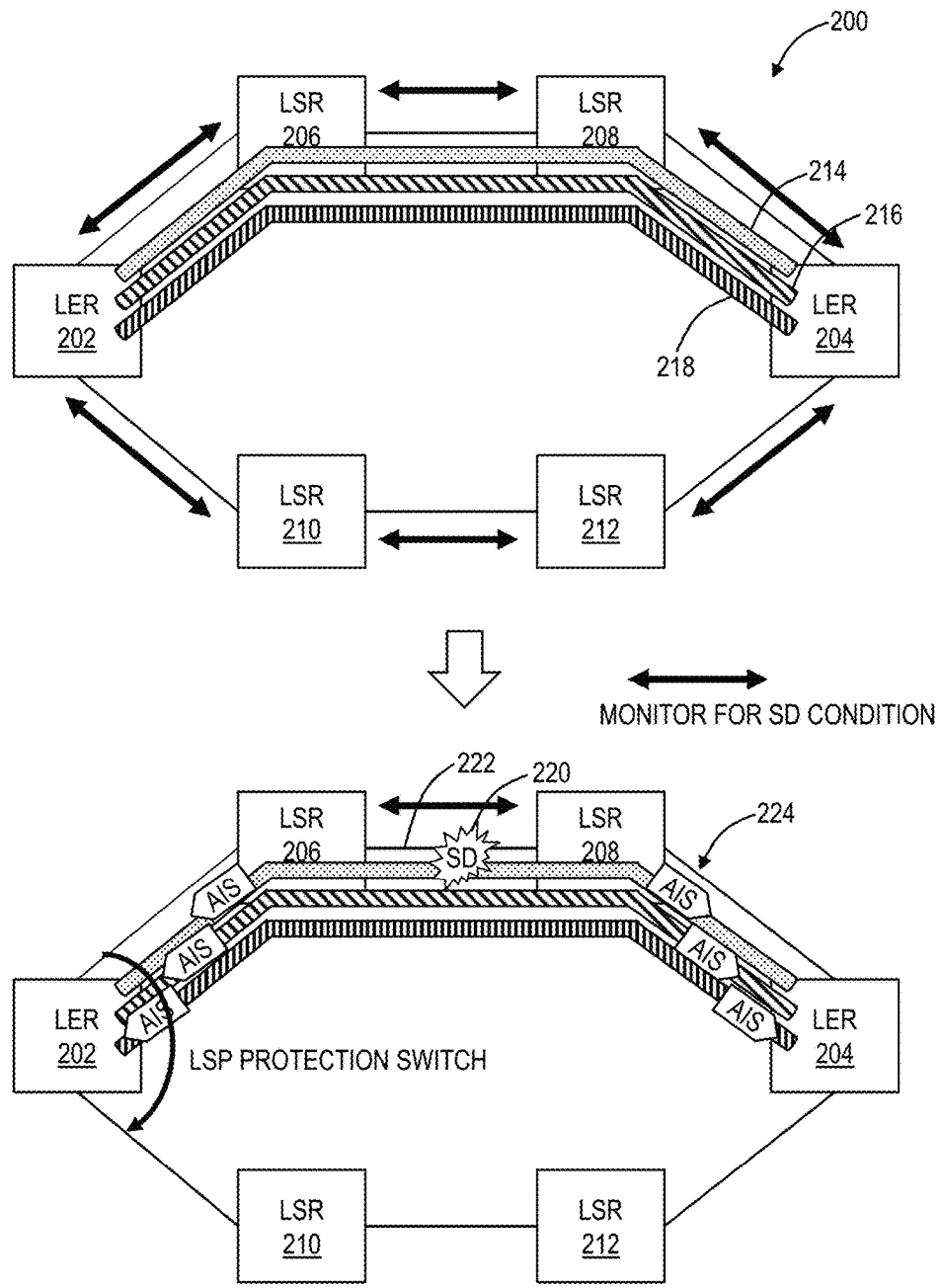
FIG. 8 is a network diagram of an MPLS network with LERs connected via LSRs for illustrating the MPLS protection switching process of FIG. 6 and the LER SD triggering protection switching process of FIG. 7.

Referring to FIG. 8, in an exemplary embodiment, a network diagram illustrates an MPLS network 200 with LERs 202, 204 connected via LSRs 206, 208, 210, 212 for illustrating the MPLS protection switching process 100 and the LER SD triggering protection switching process 130. In a top portion of FIG. 8, the MPLS network 200 includes three LSPs 214, 216, 218 between the LERs 202, 204 through the LSRs 206, 208. In a bottom portion of FIG. 8, there is an SD condition 220 detected by one of the LSRs 206, 208 on a hop 222. Subsequently, AIS messages 224 are sent in both directions from the hop 222 on each of the LSPs 214, 216, 218 to the LERs 202, 204. The LERs 202, 204 consequently perform LSP protection switching based thereon.

Again the SD condition 220 can be based on FER calculations using IEEE 802.3ah (EFM/Link OAM) frame error events and counters exceeding a threshold, FER calculations using ITU-T Y.1731 ETH-LM (LMM/LMR) frame loss ratio measurements exceeding a threshold, FER calculations using ITU-T Y.1731 ETH-SLM (SLM/SLR) frame loss ratio measurements exceeding a threshold, FD/FDV calculations using ITH-T Y.1731 ETH-DM (DMM/DMR or 1DM) exceeding a threshold, a combination of the foregoing, and the like.

Figure 9:
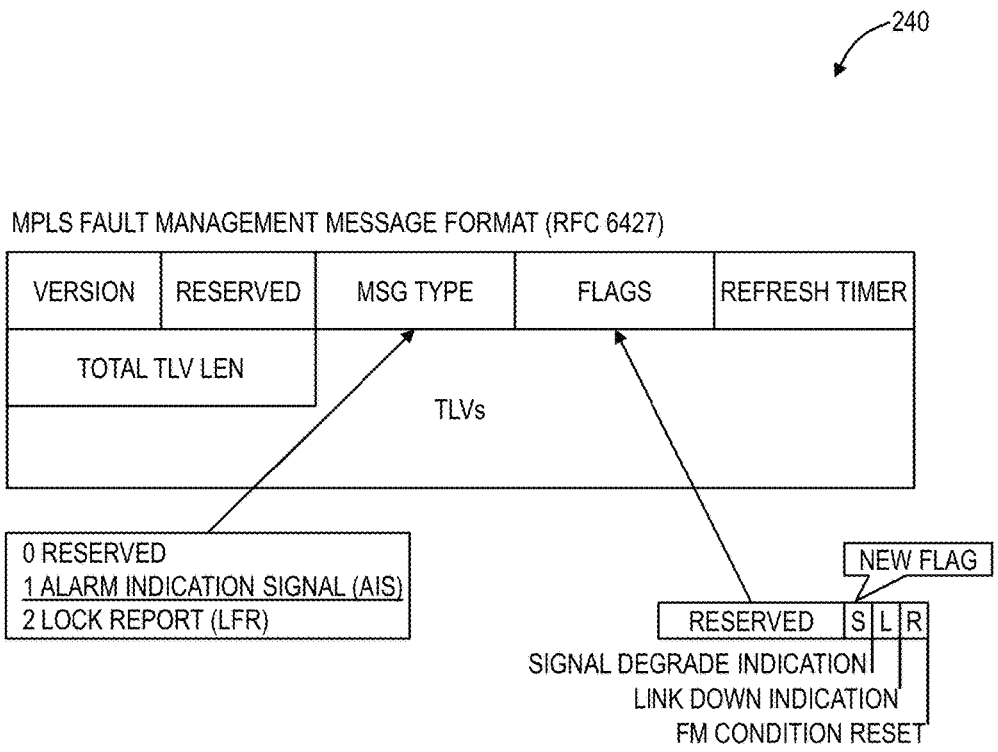
FIG. 9 is a block diagram illustrates an Alarm Indication Signal (AIS) message format for use with the MPLS protection switching process of FIG. 6, the LER SD triggering protection switching process of FIG. 7, and the MPLS network of FIG. 8.

Referring to FIG. 9, in an exemplary embodiment, a block diagram illustrates an AIS message 240 format for use with the MPLS protection switching process 100, the LER SD triggering protection switching process 130, and the MPLS network 200. The AIS message 240 format is described in additional detail in RFC 6427 previously incorporated above. The AIS message 240 is generated in response to detecting faults in the server (sub-)layer. The AIS message 240 is sent as soon as the condition is detected, but may be delayed owing to processing in an implementation, and may be suppressed if protection is achieved very rapidly. For example, the AIS message 240 may be sent during a protection switching event and would cease being sent (or cease being forwarded by the protection switch selector) if the protection switch was successful in restoring the link. The primary purpose of the AIS message 240 is to suppress alarms in the layer network above the level at which the fault occurs. When the Link Down Indication (LDI) is set, the AIS message 240 can be used to trigger recovery mechanisms.

In the AIS message 240 format in FIG. 9, the message (MSG) type is set to 1 for AIS and a new flag is included for a Signal Degrade Indication (SDI), in addition to existing flags for LDI and Fault Management (FM) condition reset. Thus, in the MPLS protection switching process 100, the LER SD triggering protection switching process 130, and the MPLS network 200, the AIS message 240 used therein has the SDI flag set. In another exemplary embodiment, an alternate encoding scheme is possible where the SDI is captured in a Type Length Value (TLV). Additionally, a signal degrade severity value can be encoded (e.g., in a TLV). The signal degrade severity can be used by the protection switching engine to determine if/when a protection switch should occur in the event that both primary and backup LSPs have an SD condition, and the severity will be used as a tie breaker.

Referring to FIG. 10, in an exemplary embodiment, tables 260, 262 illustrate examples of active state protection switching logic (table 260) and protected state protection switching logic (table 262) in an MPLS network with 16 1:1 primary and backup LSPs. Specifically, the tables 260, 262 are logical representations of data maintained at the LERs 202, 204 in implementing the MPLS protection switching process 100 and the LER SD triggering protection switching process 130. This information in the tables 260, 262 is derived from the AIS messages 240 and the associated flags. The tables 260, 262 do not represent actual FM condition reset using the R-flag setting. It is up to the reader to infer that where they see an L-flag and/or S-flag is set to N, the R-flag could be set to Y with the L-flag and/or S-flag is set to Y (to indicate clearing the condition). Additionally, the condition can be cleared if an FM message is not received within the 3.5 times Refresh Timer.

Protection Switching Via SD in G.8032

Figure 11:
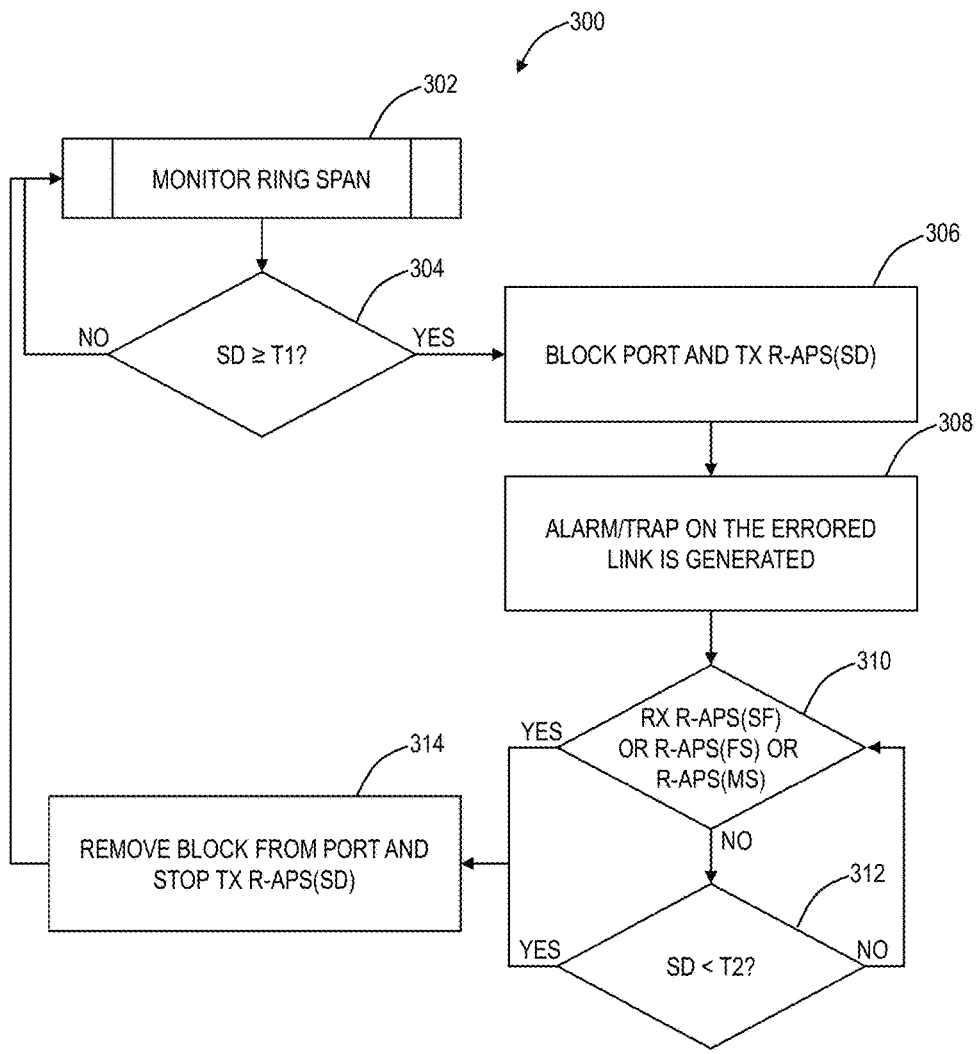
FIG. 11 is a flowchart of a G.8032 protection switching process using the SD condition.

Referring to FIG. 11, in an exemplary embodiment, a flowchart illustrates a G.8032 protection switching process 300 using the SD condition. G.8032 describes Ethernet Ring Protection Switching (ERPS) to provide sub-50 ms protection and recovery switching for Ethernet traffic in a ring topology and at the same time ensuring that there are no loops formed at the Ethernet layer. G.8032v1 supported a single ring topology and G.8032v2 supports multiple rings/ ladder topology. In G.8032, each Ethernet Ring Node is connected to adjacent Ethernet Ring Nodes participating in the same Ethernet Ring, using two independent links. A ring link is bounded by two adjacent Ethernet Ring Nodes, and a port for a ring link is called a ring port. The minimum number of Ethernet Ring Nodes in an Ethernet Ring is two. The fundamentals of this ring protection switching architecture are: a) the principle of loop avoidance; and b) the utilization of learning, forwarding, and Filtering Database (FDB) mechanisms defined in the Ethernet flow forwarding function (ETH_FF).

Loop avoidance in an Ethernet Ring is achieved by guaranteeing that, at any time, traffic may flow on all but one of the ring links. This particular link is called the Ring Protection Link (RPL), and under normal conditions this ring link is blocked, i.e., not used for service traffic. One designated Ethernet Ring Node, the RPL Owner Node, is responsible for blocking traffic at one end of the RPL. Under an Ethernet ring failure condition, the RPL Owner Node is responsible for unblocking its end of the RPL (unless the RPL has failed) allowing the RPL to be used for traffic. The other Ethernet Ring Node adjacent to the RPL, the RPL Neighbor Node, may also participate in blocking or unblocking its end of the RPL. The event of an Ethernet Ring failure results in protection switching of the traffic. This is achieved under the control of the ETH_FF functions on all Ethernet Ring Nodes. An Automatic Protection Switching (APS) protocol is used to coordinate the protection actions over the ring.

G.8032 nodes use Ring-Automatic Protection Switching (R-APS) control messages to coordinate the activities of switching on/off the RPL link, i.e., for performing protection switching. Conventionally, any failure along the ring triggers an R-APS(SF) message along both directions from the nodes adjacent to the failed link after these nodes have blocked the port facing the failed link. On obtaining this message, RPL owner unblocks the RPL port. Note that a single link failure anywhere in the ring ensures a loop-free topology. During the recovery phase when the failed link gets restored the nodes adjacent to the restored link send R-APS(NR) (R-APS no request) messages. On obtaining this message, the RPL owner block the RPL port and then sends an R-APS(NR,RB) (R-APS no request, RPL blocked) message. This will cause all other nodes other than RPL owner in the ring to unblock all the blocked ports. In the G.8032 protection switching process 300, a new R-APS message is provided for SD, i.e., R-APS(SD) for switching on/off the RPL link based on SD.

The G.8032 protection switching process 300 includes monitoring a ring span in a G.8032 network to detect an SD condition greater than or equal to a first threshold (T1) (step 304). Responsive to detecting the SD condition on a particular ring span, the node detecting the SD condition can block a ring port adjacent to the ring span and transmit R-APS(SD). The G.8032 protection switching process 300 causing generation of an alarm/trap on the errored link (step 308). In G.8032, the ring span is the packet network "connection." The alarm/trap is for a management system, such as an NMS, EMS, or the like, to notify network operators of the condition. Also, the 8032 protection switching process 300 includes monitoring to ensure there are no additional failures in the ring. Specifically, if there are hard failures (e.g., R-APS(SF) (Signal Fail)) or forced/manual switches (e.g., R-APS(FS) (Force Switch), R-APS(MS) (Manual Switch)) on other links in the ring (step 310) or if the SD condition is less than a second threshold (T2) (step 312), the G.8032 protection switching process 300 includes removing the block from the port and stopping transmission of R-APS (SD) (step 314).

Figure 12:
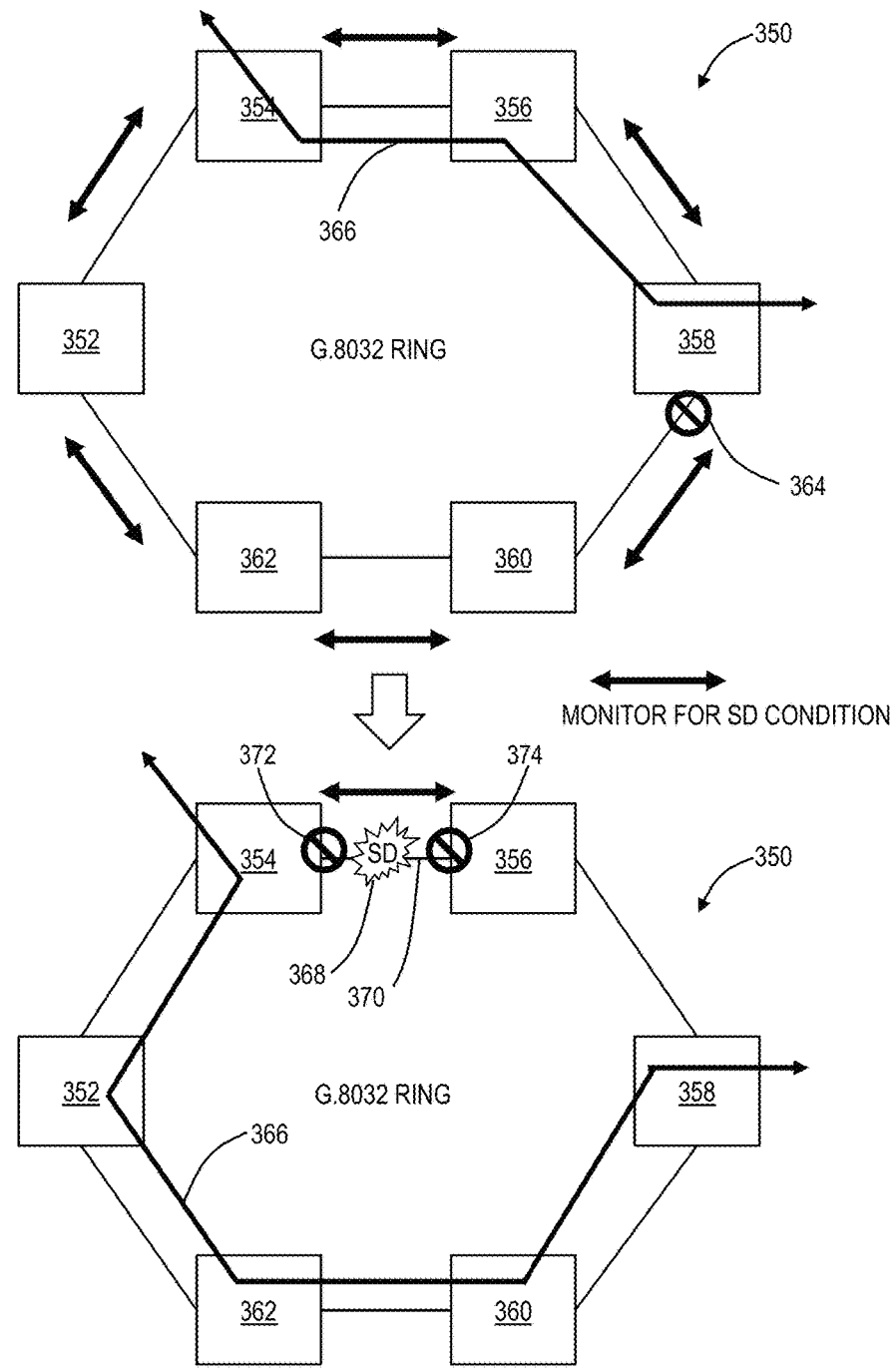
FIG. 12 is a network diagram of a G.8032 ring with various nodes for illustrating the G.8032 protection switching process of FIG. 11.

Referring to FIG. 12, in an exemplary embodiment, a network diagram illustrates a G.8032 ring 350 with various nodes 352, 354, 356, 358, 360, 362. In a top portion of FIG. 12, the ring 350 has a ring block 364 installed on a port on the node 358 facing the node 360, when all ring spans are operational (i.e., no SD, FS, SF, MS, etc.). Traffic 366 is shown between the nodes 354, 358 via the node 356. In a bottom portion of FIG. 12, an SD condition 368 is detected on a ring span 370 between the nodes 354, 356. Consequently, the nodes 354, 356 install ring blocks 372, 374 on their ports on the ring span 368, and the traffic 366 between the nodes 354, 358 now flows through the nodes 352, 362, 360.

Again, the nodes 352, 354, 356, 358, 360, 362 monitor each ring span for the SD condition which can be based on FER calculations using IEEE 802.3ah (EFM/Link OAM) frame error events and counters exceeding a threshold, FER calculations using ITU-T Y.1731 ETH-LM (LMM/LMR) frame loss ratio measurements exceeding a threshold, FER calculations using ITU-T Y.1731 ETH-SLM (SLM/SLR) frame loss ratio measurements exceeding a threshold, FD/FDV calculations using ITH-T Y.1731 ETH-DM (DMM/DMR or 1DM) exceeding a threshold, a combination of the foregoing, and the like.

Figure 13:
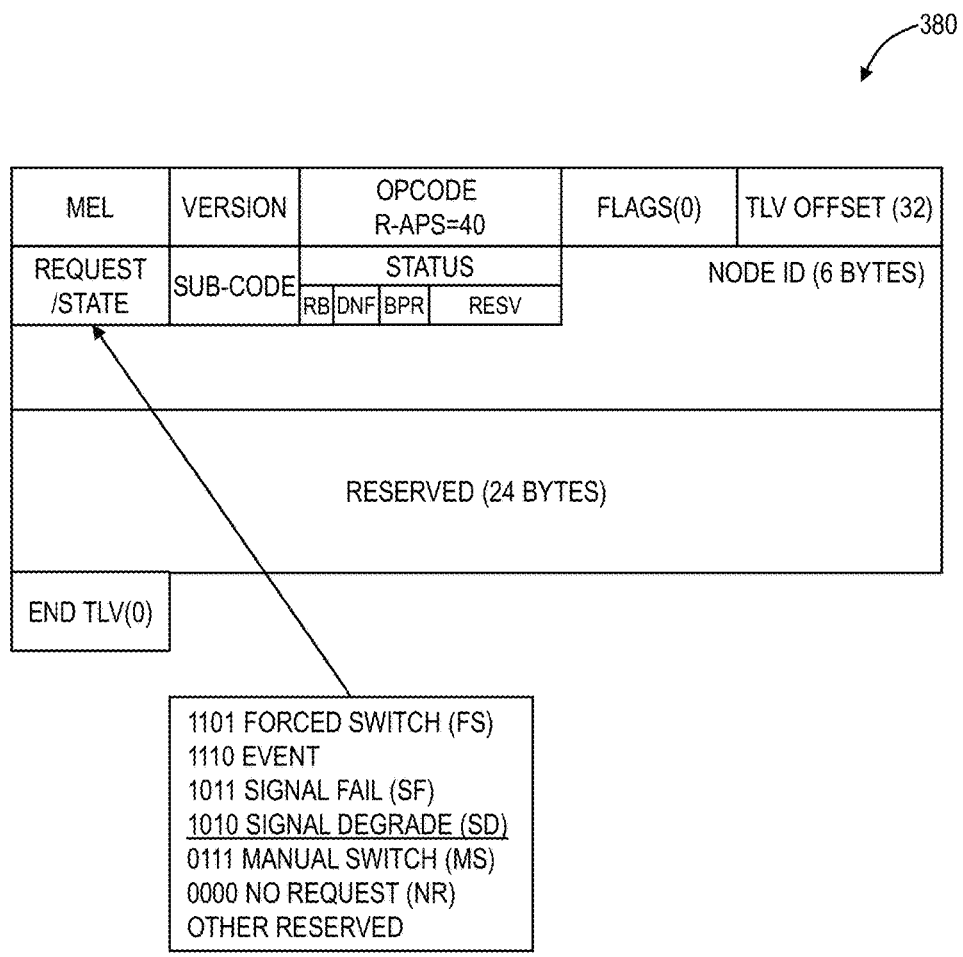
FIG. 13 is a block diagram of a Ring-Automatic Protection Switching (R-APS) message format for use with the G.8032 protection switching process of FIG. 11 and the G.8032 ring of FIG. 12.

Referring to FIG. 13, in an exemplary embodiment, a block diagram illustrates an R-APS message 380 format for use with the G.8032 protection switching process 300 and the G.8032 ring 350. Specifically, the R-APS message 380 format can be referred to as an R-APS(SD) message. In particular, the Request/State portion of the R-APS message 380 format can be updated to include SD, such as based on a value of 1010 or any other reserved, non-assigned value. Also, signal degrade severity values could be encoded either in the "Reserved" field or within an optional TLV of the R-APS Protocol Data Unit (PDU). The signal degrade severity can be used by the protection switching engine to determine if/when a protection switch should occur in the event that multiple ring spans have a signal degrade condition, and the severity can be used as a tie breaker.

Referring to FIGS. 14-18, in an exemplary embodiment, tables 382, 384, 386, 388, 390 illustrate G.8032 SD priority (table 382), G.8032 Protocol State Machine Extensions (tables 384, 386, 388), and G.8032 Protocol State Machine Signal Degrade State (table 390). Upon the reception of an R-APS (SD) PDU, protection switching decisions occur. The prioritization of the R-APS "request" is illustrated in table 382 in FIG. 14. As illustrated, the SD "request(s)" are a lower priority than FS, SF, MS. The G.8032 protection switching process 300 and the G.8032 ring 350 include modification of the G.8032 state machine to support the SD condition. FIGS. 15-18 illustrate the tables 384, 386, 388, 390 with the G.8032 state machine modified to support the SD condition.

The G.8032 state machine includes node states of:

| State | Node State |
|---|---|
| A | IDLE |
| B | PROTECTION |
| C | MANUAL SWITCH |
| D | FORCE SWITCH |
| E | PENDING |
| F | DEGRADED |

Specifically, in the tables 384, 386, 388, 390, the newly added top priority requests for inputs along with actions and next node state for outputs based on G.8032 supporting SD are highlighted. Also, a new, sixth state "F" is added for DEGRADED.

In the IDLE state, a node remains as long as the spans are clear. If there is a local SD on one of the node's spans, the logic includes if degraded ring port is already blocked: TX R-APS(SD, DNF (Do Not Flush)) and unblock non-failed ring port, else: block degraded ring port, TX R-APS(SD), unblock non-failed ring port, and flush the Forwarding Database (FDB), and the node proceeds to the DEGRADED state. If a local clear SD is received, no action is performed, and the node remains in the IDLE state. Finally, if R-APS (SD) is received (a non-local SD), the node unblocks the non-failed ring port and stops transmission of R-APS and the node proceeds to the PROTECTION state.

In the PROTECTION state, the node remains regardless of clear, local SD, local clear SD, and R-APS(SD). In the MANUAL SWITCH state, the node proceeds to the PENDING state if everything is clear and remains in the MANUAL SWITCH state regardless of local SD, local clear SD, and R-APS(SD). In the FORCE SWITCH state, the node proceeds to the PENDING state if everything is clear and remains in the FORCE SWITCH state regardless of local SD, local clear SD, and R-APS(SD).

In the PENDING state, the node remains in the PENDING state if everything is clear. If there is a local SD on one of the node's spans, the logic includes if degraded ring port is already blocked: TX R-APS(SD, DNF) and unblock non-failed ring port, else: block degraded ring port, TX R-APS(SD), unblock non-degraded ring port, and flush FDB; and if the node is the RPL owner node: stop Wait to Restore (WTR) and stop Wait to Block (WTB), and the node proceeds to the DEGRADED state. If there is a local clear SD, no action is taken, and the node proceeds to the FORCE SWITCH state. Finally, if there is an R-APS(SD), the logic includes unblock non-degraded ring port and stop TX R-APS, and if RPL owner node: stop WTR and stop WTB, and proceed to the DEGRADED state.

In the DEGRADED state, the node remains in the DEGRADED step if everything is clear. If an FS is received, the logic include if requested ring port is already blocked: TX R-APS(SD, DNF) and unblock non-requested ring port, else: block degraded ring port, TX R-APS(SD), unblock non-requested ring port, and flush FDB, and the node proceeds to the PENDING state. If an R-APS(FS) is received, the logic includes unblock ring ports and stop TX R-APS, and the node proceeds to the PENDING state. If a local SF is detected, the logic includes if failed ring port is already blocked: TX R-APS(SD, DNF) and unblock non-failed ring port, else: block failed ring port, TX R-APS(SD), unblock non-failed ring port, and flush FDB, and the node proceeds to the PROTECTION state.

If a local clear SF is received, the logic includes start guard timer and TX R-APS(NR), and if RPL owner node and in a revertive mode: start WTR, and the node proceeds to the PENDING state. For any of R-APS(SF), R-APS(MS), MS, local SD, local clear SD, R-APS(SD), WTR expires, WTR running, WTB expires, WTB running, and R-APS (NR, RB), no action occurs, and the node remains in the DEGRADED state. If R-APS(NR) is received and if the RPL owner and in the revertive mode, the logic includes start WTR, and the node proceeds to the PENDING state.

Exemplary Packet Switching Node

Figure 19:
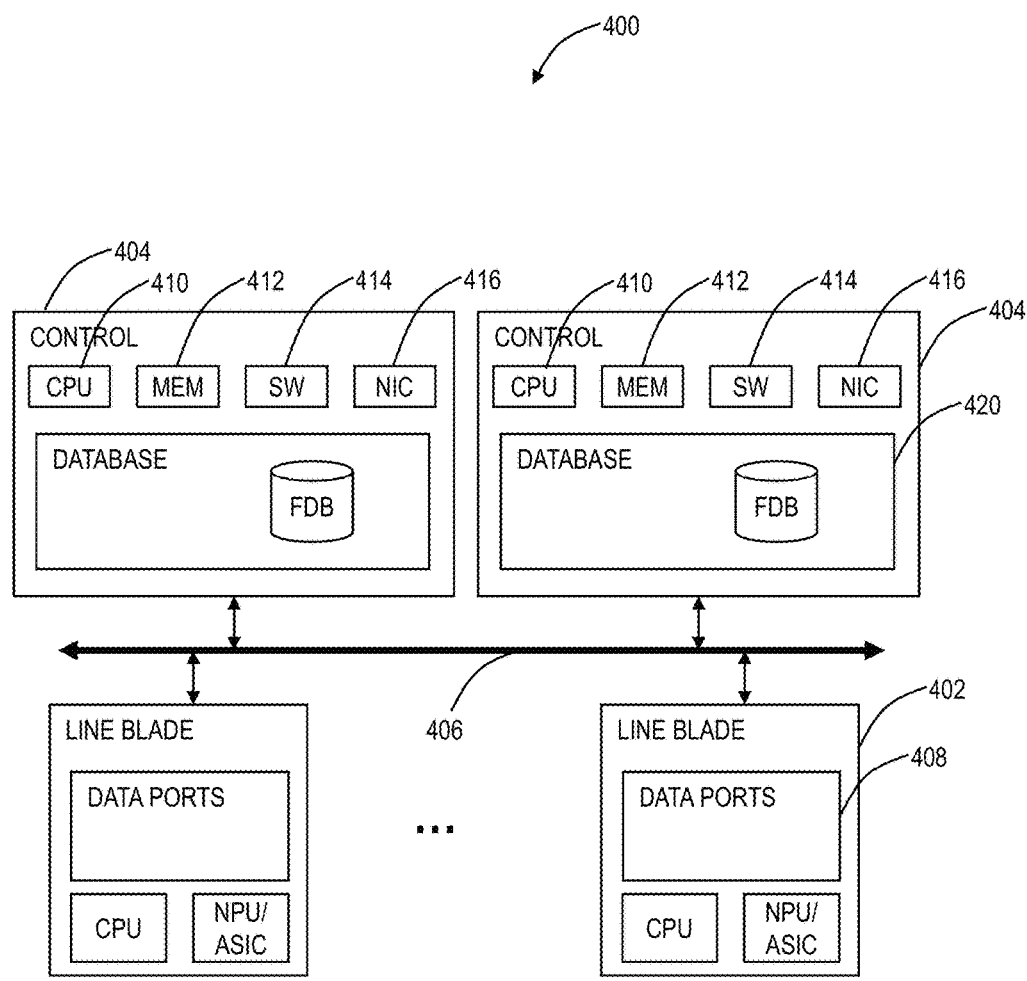
FIG. 19 is a block diagram of an exemplary implementation of a node for implementation of the systems and methods described herein.

Referring to FIG. 19, in an exemplary embodiment, a block diagram illustrates an exemplary implementation of a node 400 for implementation of the systems and methods described herein. In this exemplary embodiment, the node 400 is an Ethernet or MPLS network switch, but those of ordinary skill in the art will recognize the systems and methods described herein can operate with other types of network elements and other implementations. In this exemplary embodiment, the node 400 includes a plurality of blades 402, 404 interconnected via an interface 406. The blades 402, 404 are also known as line cards, line modules, circuit packs, pluggable modules, etc. and generally refer to components mounted on a chassis, shelf, etc. of a data switching device, i.e., the node 400. Each of the blades 402, 404 can include numerous electronic devices and optical devices mounted on a circuit board along with various interconnects including interfaces to the chassis, shelf, etc.

Two exemplary blades are illustrated with line blades 402 and control blades 404. The line blades 402 include data ports 408 such as a plurality of Ethernet ports. For example, the line blade 402 can include a plurality of physical ports disposed on an exterior of the blade 402 for receiving ingress/egress connections. Additionally, the line blades 402 can include switching components to form a switching fabric via the interface 406 between all of the data ports 408 allowing data traffic to be switched between the data ports 408 on the various line blades 402. The switching fabric is a combination of hardware, software, firmware, etc. that moves data coming into the node 400 out by the correct port 408 to the next node 400. "Switching fabric" includes switching units, or individual boxes, in a node; integrated circuits contained in the switching units; and programming that allows switching paths to be controlled. Note, the switching fabric can be distributed on the blades 402, 404, in a separate blade (not shown), or a combination thereof. The line blades 402 can include an Ethernet manager (i.e., a processor) and a Network Processor (NP)/Application Specific Integrated Circuit (ASIC).

The control blades 404 include a microprocessor 410, memory 412, software 414, and a network interface 416. Specifically, the microprocessor 410, the memory 412, and the software 414 can collectively control, configure, provision, monitor, etc. the node 400. The network interface 416 may be utilized to communicate with an element manager, a network management system, etc. Additionally, the control blades 404 can include a database 420 that tracks and maintains provisioning, configuration, operational data and the like. The database 420 can include a forwarding database (FDB) that may be populated as described herein (e.g., via the user triggered approach or the asynchronous approach). In this exemplary embodiment, the node 400 includes two control blades 404 which may operate in a redundant or protected configuration such as 1:1, 1+1, etc. In general, the control blades 404 maintain dynamic system information including packet forwarding databases, protocol state machines, and the operational status of the ports 408 within the node 400.

It will be appreciated that some exemplary embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the exemplary embodiments described herein, a corresponding device such as hardware, software, firmware, and a combination thereof can be referred to as "circuitry configured or adapted to," "logic configured or adapted to," etc. perform a set of operations, steps, methods, processes, algorithms, functions, techniques, etc. as described herein for the various exemplary embodiments.

Moreover, some exemplary embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various exemplary embodiments.

Although the present disclosure has been illustrated and described herein with reference to preferred embodiments and specific examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

What is claimed is:

1. A method of protection switching in a packet network based on signal/service degrade, the method comprising:
    monitoring a packet network connection;
    detecting the packet network connection has a signal/service degrade comprising a condition where the packet network connection is operational, but experiencing errors determined on the packet network connection at a packet layer below a threshold, wherein the signal/service degrade is detected in part through a Frame Error Rate which is inferred from a Bit Error Rate and frame size; and
    responsive to detection of the signal/service degrade, performing one or more of notifying nodes in the packet network and performing a protection switch at the packet layer based on the signal/service degrade.

2. The method of claim 1, wherein the signal/service degrade is further detected in part through one or more performance metrics used in combination with the Frame Error Rate.

3. The method of claim 1, wherein the packet network connection comprises one or more of a Label Switched Path (LSP), a Link Aggregation Group (LAG) member, a G.8032 ring span, a Virtual Local Area Network (VLAN), and a tunnel.

4. The method of claim 1, wherein the protection switch is performed if a backup connection is active and has either a less severe signal/service degrade or no signal/service degrade thereon.

5. The method of claim 1, wherein the notifying comprises one of providing a signal/service degrade indication in an Alarm Indication Signal (AIS), providing the signal/service degrade indication in a Ring-Automatic Protecting Switching (R-APS) message, providing the signal/service degrade indication via Link Aggregation Control Protocol (LACP), and cessation of exchange of LACP.

6. The method of claim 1, wherein the packet network connection comprises a Link Aggregation Group (LAG) member, wherein the protection switch comprises forcing a member with the signal/service degrade into a non-distributing/collecting state, and the notifying utilizes Link Aggregation Control Protocol (LACP).

7. The method of claim 1, wherein the packet network connection comprises a Label Switched Path (LSP), wherein the notifying comprises transmitting Alarm Indication Signal (AIS) over the LSP, and wherein the protection switch comprises a switch at a Label Edge Router to a backup connection.

8. The method of claim 1, wherein the packet network connection comprises a G.8032 ring span, wherein the protection switch comprises blocking a port on the G.8032 ring span, and the notifying comprises transmitting a Ring-Automatic Protecting Switching (R-APS) message.

9. An apparatus for protection switching in a packet network based on signal/service degrade, the apparatus comprising:
    circuitry adapted to monitor a packet network connection;
    circuitry adapted to detect the packet network connection has a signal/service degrade comprising a condition where the packet network connection is operational, but experiencing errors determined on the packet network connection at a packet layer below a threshold, wherein the signal/service degrade is detected in part through a Frame Error Rate which is inferred from a Bit Error Rate and frame size; and
    circuitry, responsive to detection of the signal/service degrade, adapted to one or more of notify nodes in the packet network with a notification and perform a protection switch at the packet layer based on the signal/service degrade.

10. The apparatus of claim 9, wherein the signal/service degrade is further detected in part through one or more performance metrics used in combination with the Frame Error Rate.

11. The apparatus of claim 9, wherein the packet network connection comprises one or more of a Label Switched Path (LSP), a Link Aggregation Group (LAG) member, a G.8032 ring span, a Virtual Local Area Network (VLAN), and a tunnel.

12. The apparatus of claim 9, wherein the protection switch is performed if a backup connection is active and has either a less severe signal/service degrade or no signal/service degrade thereon.

13. The apparatus of claim 9, wherein the notification comprises one of a signal/service degrade indication in an Alarm Indication Signal (AIS), the signal/service degrade indication in a Ring-Automatic Protecting Switching (R-APS) message, the signal/service degrade indication via Link Aggregation Control Protocol (LACP), and cessation of exchange of LACP.

14. The apparatus of claim 9, wherein the packet network connection comprises a Link Aggregation Group (LAG)

member, wherein the protection switch comprises forcing a member with the signal/service degrade into a non-distributing/collecting state, and the notification utilizes Link Aggregation Control Protocol (LACP).

15. The apparatus of claim 9, wherein the packet network connection comprises a Label Switched Path (LSP), wherein the notification comprises an Alarm Indication Signal (AIS) transmitted over the LSP, and wherein the protection switch comprises a switch at a Label Edge Router to a backup connection.

16. The apparatus of claim 9, wherein the packet network connection comprises a G.8032 ring span, wherein the protection switch comprises a blocked port on the G.8032 ring span, and the notification comprises a Ring-Automatic Protecting Switching (R-APS) message.

17. A node in a packet network adapted for protection switching based on signal/service degrade, the node comprising:
  a plurality of ports communicatively coupled to the packet network;
  a controller communicatively coupled to the plurality ports, wherein the controller is adapted to
    monitor a packet network connection on one of the plurality of ports,
    detect the packet network connection has a signal/service degrade comprising a condition where the packet network connection is operational, but experiencing errors determined on the packet network connection at a packet layer below a threshold, wherein the signal/service degrade is detected in part through a Frame Error Rate which is inferred from a Bit Error Rate and frame size, and
    responsive to detection of the signal/service degrade, one or more of notify nodes in the packet network with a notification and perform a protection switch at the packet layer based on the signal/service degrade.

18. The node of claim 17, wherein the signal/service degrade is further detected in part through one or more performance metrics used in combination with the Frame Error Rate.

19. The node of claim 17, wherein the packet network connection comprises one or more of a Label Switched Path (LSP), a Link Aggregation Group (LAG) member, a G.8032 ring span, a Virtual Local Area Network (VLAN), and a tunnel.

20. The node of claim 17, wherein the notification comprises one of a signal/service degrade indication in an Alarm Indication Signal (AIS), the signal/service degrade indication in a Ring-Automatic Protecting Switching (R-APS) message, and the signal/service degrade indication via Link Aggregation Control Protocol (LACP).

* * * * *